(12) United States Patent
Wick (10) Patent No.: US 9,483,265 B2
(45) Date of Patent: Nov. 1, 2016

(54) VECTORIZED LOOKUP OF FLOATING POINT VALUES

(71) Applicant: Nuance Communications, Inc., Burlington, MA (US)

(72) Inventor: Justin Vaughn Wick, Acton, MA (US)

(73) Assignee: Nuance Communications, Inc., Burlington, MA (US)

( * ) Notice: Subject to any disclaimer, the term of this patent is extended or adjusted under 35 U.S.C. 154(b) by 630 days.

(21) Appl. No.: 13/956,696

(22) Filed: Aug. 1, 2013

(65) Prior Publication Data

US 2015/0039854 A1 Feb. 5, 2015

(51) Int. Cl.
*G06F 9/30* (2006.01)
*G06F 9/345* (2006.01)
*G06F 9/355* (2006.01)

(52) U.S. Cl.
CPC ....... *G06F 9/30036* (2013.01); *G06F 9/30032* (2013.01); *G06F 9/345* (2013.01); *G06F 9/355* (2013.01)

(58) Field of Classification Search
CPC .......... G06F 9/30036; G06F 9/30032; G06F 9/345; G06F 9/355; G01L 15/02; G01L 15/20; G01L 15/08; G01L 15/24; G01L 15/30; G01L 15/32
USPC ..................... 704/2, 9, 231, 243, 277; 712/4
See application file for complete search history.

*Primary Examiner* — Thierry L Pham
(74) *Attorney, Agent, or Firm* — Wolf, Greenfield & Sacks, P.C.

(57) ABSTRACT

Systems and techniques disclosed herein include methods for de-quantization of feature vectors used in automatic speech recognition. A SIMD vector processor is used in one embodiment for efficient vectorized lookup of floating point values in conjunction with fMPE processing for increasing the discriminative power of input signals. These techniques exploit parallelism to effectively reduce the latency of speech recognition in a system operating in a high dimensional feature space. In one embodiment, a bytewise integer lookup operation effectively performs a floating point or a multiple byte lookup.

20 Claims, 8 Drawing Sheets

VECTORIZED LOOKUP OF FLOATING POINT VALUES

FIELD OF INVENTION

The present disclosure relates to speech recognition. The present disclosure also relates to processing of feature vectors and, more specifically, to vector processing used to improve speech recognition processing.

BACKGROUND

Processing capability of mobile devices has rapidly grown in recent years. Such growth has opened up application areas for speech and natural language processing technologies. For example, voice search is one such application where speech technology is making a significant impact by enabling people to access the Internet conveniently from mobile devices. Spoken queries are a natural medium for searching the Mobile Web, especially in the common case where typing on a device keyboard is impractical or inconvenient. Voice search is now recognized as a core feature of many mobile devices, and several related applications have been developed.

Automatic speech recognition, allows individuals to use a voice command or voice query to search the Internet and/or electronic devices. A voice search is a search executed using a spoken query or spoken utterance. Such voice searching typically involves a device or processor converting a spoken utterance into text, such as by converting spoken words, numbers and characters into a text string or textual representation of the spoken utterance. Several Automatic speech recognition techniques require the processing of numerous feature vectors of speech objects using Gaussian Mixture Model (GMM), hidden Markov model (HMM), and Feature-space Minimum Phone Error (fMPE) techniques.

Mobile platforms also have low available RAM for storing fMPE transformation matrices, so the floating point number are converted to integers and highly compressed via quantization to 2-bits per coefficient. The fMPE techniques are used for training (e.g., hidden Markov Model parameters) in speech recognition and other applications. The fMPE transforms are applied to the feature vector (fingerprint) of each incoming frame of audio in order to make the vector more useful for discriminating between similar phones. When running automatic speech recognition (ASR) on a mobile platform, floating point operations for FMPE can take up to 10% of the central processing unit (CPU) time. To parallelize matrix operations, one must parallelize de-quantization (else the de-quantization step dominates the computation time). This de-quantization requires a table lookup for each value. The fMPE values are quantized to 2-bits, and each 2-bit pattern must be de-quantized to an (arbitrary) 32-bit floating point value.

SUMMARY

Automatic Speech Recognition (ASR) on mobile platforms and other platforms using feature vector techniques has many challenges. The conventional approach for processing feature vectors on a mobile phone involves numerous operations including multiple step manipulating and de-quantizing fMPE transformation matrices. Such approach, however, suffers from placing a high processing load on the CPU. On certain CPUs, the hardware provides some single instruction multiple data (SIMD) 8-bit table lookup operations, but de-quantizing fMPE transformation matrices requires the ability to provide 32-bit floating point values and in some applications 16-bit or 64-bit floating point values.

The inventor has observed that on a particular processor that a permute instruction (e.g., a VTBL instruction) can be used to look up multiple 32 bit floating values in parallel effectively de-quantizing stored 2-bit values by exploiting a heretofore unknown capability of a particular family of processors. It is understood that the techniques disclosed herein, can be applied to other processors having similar capabilities.

In one embodiment, a technique includes loading a first set of data elements into a lookup table having a base address, loading a first vector register with a translation constant corresponding to the arrangement of the first set of data elements, loading a second set of data elements into a index register, invoking a vector addition instruction to combine the translation constant and the index register and invoking a vector permute instruction on the first set of data elements at the base address and the combined translation constant and index register to decode the second set of data elements into a set of segments in a destination memory. Such a technique can speed up FMPE processing by a factor of four or more (i.e., 400 percent speed up) in some embodiments. This results in reducing CPU processing time from, for example, approximately about ten percent of total available CPU time to approximately about three percent. In some applications a seven percent speedup is considered commercially significant.

In a further embodiment, loading a second set of data elements into an index register further includes replicating each element of the second set of data elements to populate the index register. In other embodiments, the destination memory includes a plurality of vector registers, the set of segments include a representation of a floating point constant, and the technique further includes invoking at least one vector instruction operating on the floating point constant. In one embodiment the vector instruction is a multiplication of a feature vector and row of an fMPE matrix and the technique further includes reconstructing quantized values for performing fMPE operations to enable automatic speech recognition.

One exemplary system includes a memory including one or more instructions stored thereon that, when executed by one or more processors, cause the one or more processors to perform operations including loading a first set of data elements into a lookup table having a base address, loading a first vector register with a translation constant corresponding to the arrangement of the first set of data elements, loading a second set of data elements into a index register, invoking a vector addition instruction to combine the translation constant and the index register and invoking a vector permute instruction on the first set of data elements at the base address and the combined translation constant and index register to decode the second set of data elements into a set of segments in a destination memory.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: loading a first set of data elements into a lookup table having a base address, loading a first vector register with a translation constant corresponding to the arrangement of the first set of data elements, loading a second set of data elements into an index register, invoking a vector addition instruction to combine the translation constant and the index register and invoking a vector permute instruction on the first set of data elements at the base address and the combined translation constant and index register to decode the second set of data elements into a set of segments in a destination memory.

The instructions, and method as described herein, when carried out by a processor of a respective computer device, cause the processor to perform the methods disclosed herein. Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order. Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations.

As discussed above, techniques herein are well suited for use in software applications supporting speech recognition applications. It should be noted, however, that embodiments herein are not limited to use in such applications and that the techniques discussed herein are well suited for other applications and data arrangements as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

FMPE calculations are a fundamental part of speech recognition processing. Language models are typically statistical models that can indicate a probability of any particular word sequence, prior to analyzing any spoken utterance. Thus, the statistical language model has a likelihood of saying a particular sequence of words. Such statistical language models are conventionally trained by collecting a huge corpus of phrases/utterances/word sequences (which can be domain specific) and produce a very large feature space. Techniques disclosed herein include systems and methods for improving the performance of feature vector processing on a mobile device with limited processing resources. In particular these techniques speed up the de-quantization process.

Figure 1:
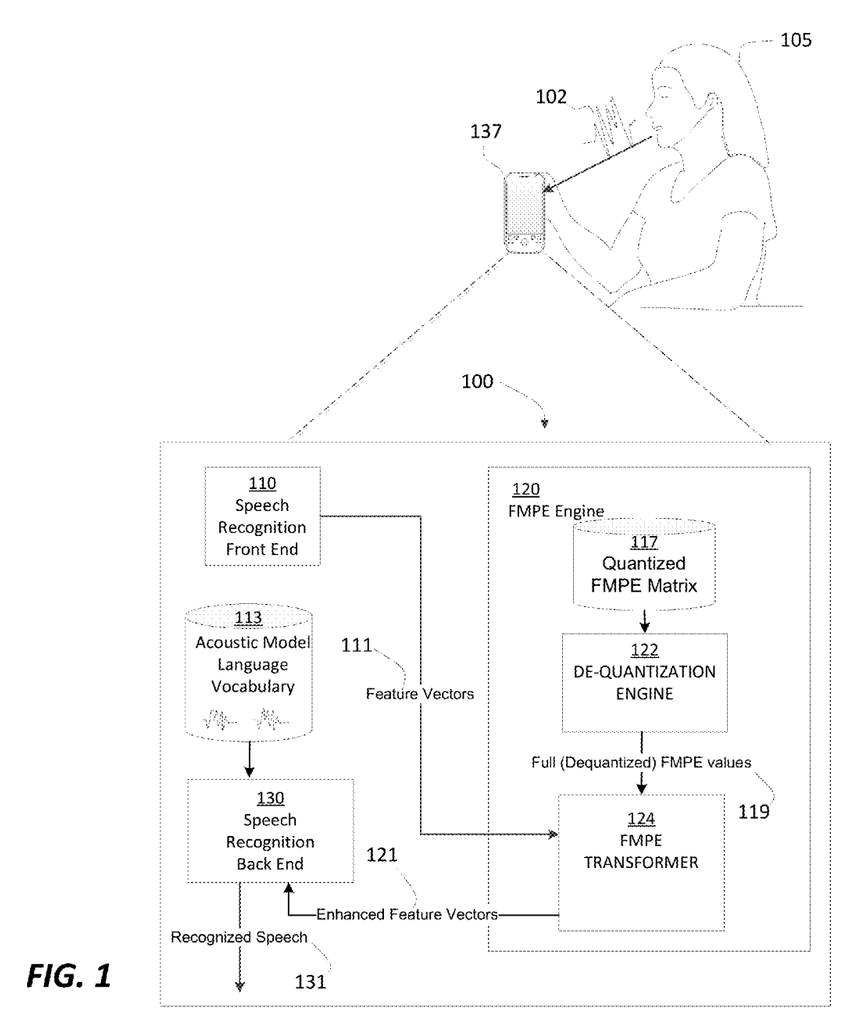
FIG. 1 is a block diagram of a system for voice-enabled search including a de-quantization engine according to embodiments herein.

Referring now to FIG. 1, a block diagram illustrates a general architecture of the system and process. Input to the system is any spoken utterance 102 (e.g., a voice query, notes, directions, replies, a voice message, etc.) issued by a speaker 105, typically captured by a mobile device 137. This speaker could be a caller of a mobile telephone, operator of a desktop computer, driver operating a vehicle computer system, user of a wireless tablet computer, etc. In response to the mobile device 137 capturing the voice query, this voice query can be transmitted to a computer system 100, which can be a remote server or similar device. Alternatively, mobile device 137 can include functionality to recognize text and to function as computer system 100.

The computer system 100 includes an automated speech recognition (ASR) front end 110, an FMPE engine 120 and an acoustic model language vocabulary 113 connected to an ASR back end 130. The speech recognition process includes receiving speech 102. This is converted to a waveform for analysis by ASR front end 110. The waveform is then analyzed by an ASR process. Such analysis can include using an acoustic model in conjunction with a phrased-based model (statistical language model), and one or more vocabularies 113.

The ASR front end 110 produces feature vectors 111. The feature vectors are used by the FMPE engine 120 as described below in further detail to produce enhanced feature vectors 121 which are used in conjunction with the acoustic model language vocabulary 113 by the ASR back end 130 to produce recognized speech 131 which in one embodiment is provided in the form of text.

As part of the speech recognition process, the system 100 processes quantized feature vectors 111 using an fMPE engine 120. The fMPE engine 120 includes a de-quantization engine 122, a predetermined quantized fMPE matrix 117 and an fMPE transformer 124, which in one embodiment comprises matrix multiply operations. The de-quantization engine 122 uses the predetermined quantized fMPE matrix 117 to produce full (i.e., dequantized) fMPE values 119. The fMPE transformer 124 uses the full fMPE values 119 to produce the enhanced feature vectors 121, which are integrated with an acoustic model to recognize the speech 102.

Functionality associated with de-quantization engine 122 will now be discussed via diagrams, pseudo-code and flowchart in FIG. 2 through FIG. 5. For purposes of the following discussion, the de-quantization engine 122 or other appropriate entity performs steps in the flowcharts.

Figure 2:
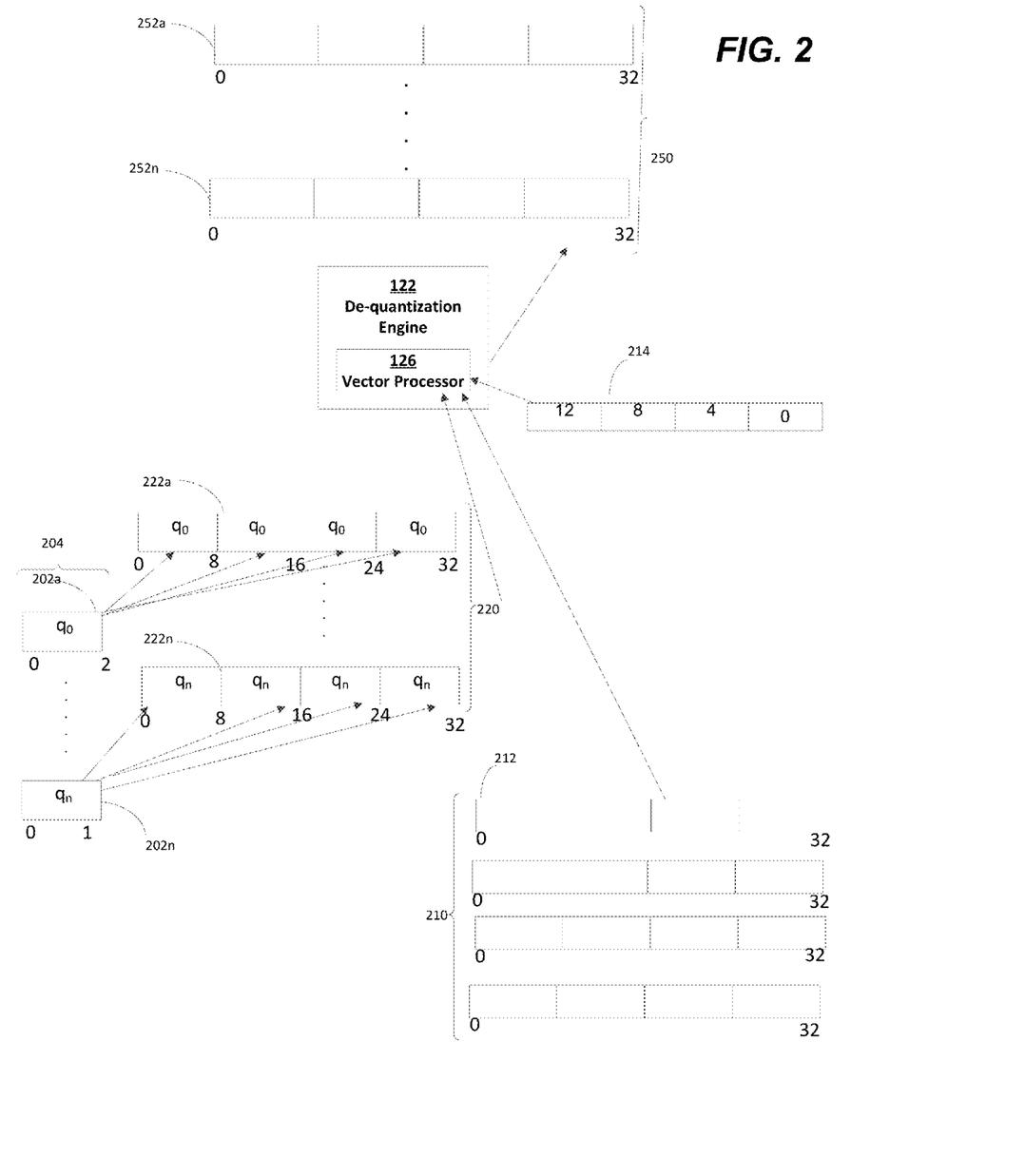
FIG. 2 is a flow diagram illustrating an example the operation of the of de-quantization engine of FIG. 1.

Referring now to FIG. 2, an exemplary de-quantization engine 122 includes a vector processor 126 having storage for different data types which can be operated on by the vector processor 126. The storage includes a first set of data elements 210 configured as a lookup table having a base address 212, a set of index registers 222a-222n (collectively referred to as index registers 222) and a translation constant register 214 holding a translation constant corresponding to the arrangement of the first set of data elements 210. The storage further includes a set of segments 252a-252n in a destination memory 250. In one embodiment, the data elements 210 are dequantized fMPE values that retrieved from the lookup table. In one embodiment, the set of index registers 220 includes index registers 222 that include the quantized values which are replicated, to be used in conjunction with a lookup instruction as described below in further detail.

In operation in a particular embodiment, the de-quantization engine 122 executes in firmware or software as described above using the vector processor 126 to transform a plurality 204 of 2-bit quantized data elements 202a-202m into the a set of segments (e.g., 32-bit floating point values) in destination memory 250. Here for example, the 2-bit quantized data element 202a $q_0$ is replicated four times and unpacked into four bytes of the 32-bit index register 222a (bits 0 to 31 comprise the 32 bit index register. The dequantization and transformation process primarily occurs within the register of the vector processor 126 so that the results are immediately available for further vector operations.

The storage can be in vector registers or memory accessed by the vector processor 126. In one embodiment, an ARM v7 processor includes an ARM NEON™ SIMD instruction set (also referred to as Advanced SIMD), and NEON has an instruction VTBL. The VTBL instruction uses the first set of data elements 210 as a lookup table the set of index registers 222 and the register holding a translation constant translation constant register 214 to generate the set of segments in destination memory 250. In this embodiment, there are 16 8-bit "lanes" in each quadword register (i.e., 32 registers, 64-bits wide double words or 16 registers, 128-bits wide quadwords). The instruction translates the value in each (8-bit) lane using a lookup table included in a sequence of contiguous NEON registers. Other processor, for example, Intel x86 based AVX instruction set includes lookup table instructions which may be used with similar techniques. It is noted that the size of the translation constant register 214, the lookup table of data elements 210, the replication factor and the bit lengths of the various registers as well as the size of each of plurality 204 of 2-bit quantized data elements can vary according to the hardware features of a particular vector processor 126 selected for the de-quantization engine 122.

Figure 3:
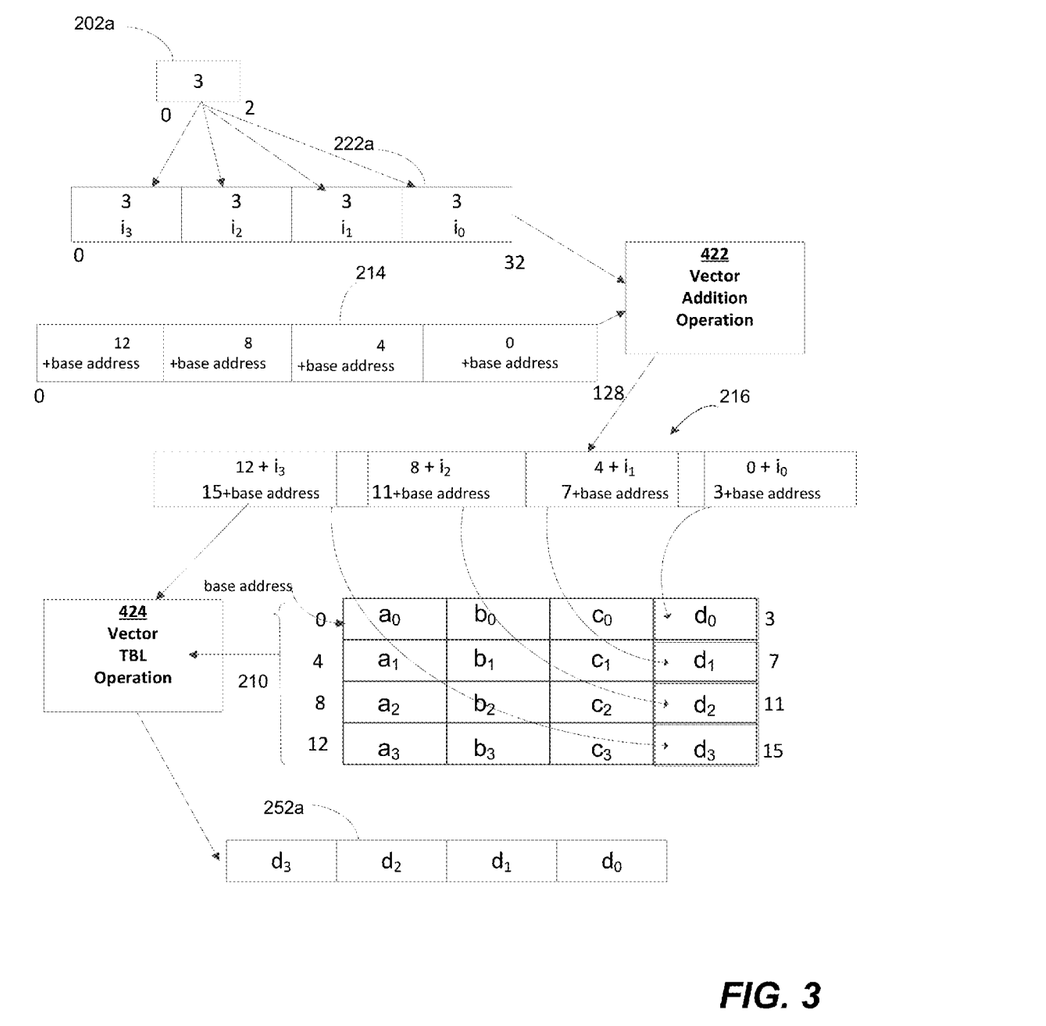
FIG. 3 is a memory and register layouts of the de-quantization engine of FIG. 1.

Referring now to FIG. 3, the operation of the de-quantization engine 122 is shown for a single 2-bit quantized fMPE value 202a to be de-quantized. An index register 222a includes replicated values in all four lanes. A first vector register is configured with a translation constant and the base address.

In this example, one 32-bit lane of the index register 222a would have the binary value: 00000011000000110000001100000011. Other 32-bit lanes would have similar replicated bit patterns for other fMPE values to be de-quantized. Next a base address register is added to the quadword. This base address register is constructed to be 4 32-bit addresses (quadruplicated), and this 32-bit address is chosen so as to point at the start of a register file (base address) which will contain byte values, arranged so that the table lookups will result in the correct de-quantization. The result of the vector addition operation 422 is a combined translation constant and index register 216 (also referred to as a final index 216).

Thus, when the VTBL instruction is invoked with the combined translation constant and the index register 216 and the base address as operands configured as described above. Execution of the single VTBL instruction effectively decodes the 2-bit quantized fMPE value 202a into 32-bit floating point segment of four bytes. Here, the 2-bit quantized fMPE data element 202a is decoded into the 32-bit floating point value $\{d_3 \ldots d_0\}$ 252a as part of a set of segments in a destination memory 250. It is understood that multiple quantized fMPE values can be decoded using a single VTBL instruction (or equivalent) depending on the size and quantity of vector registers available.

Figure 4:
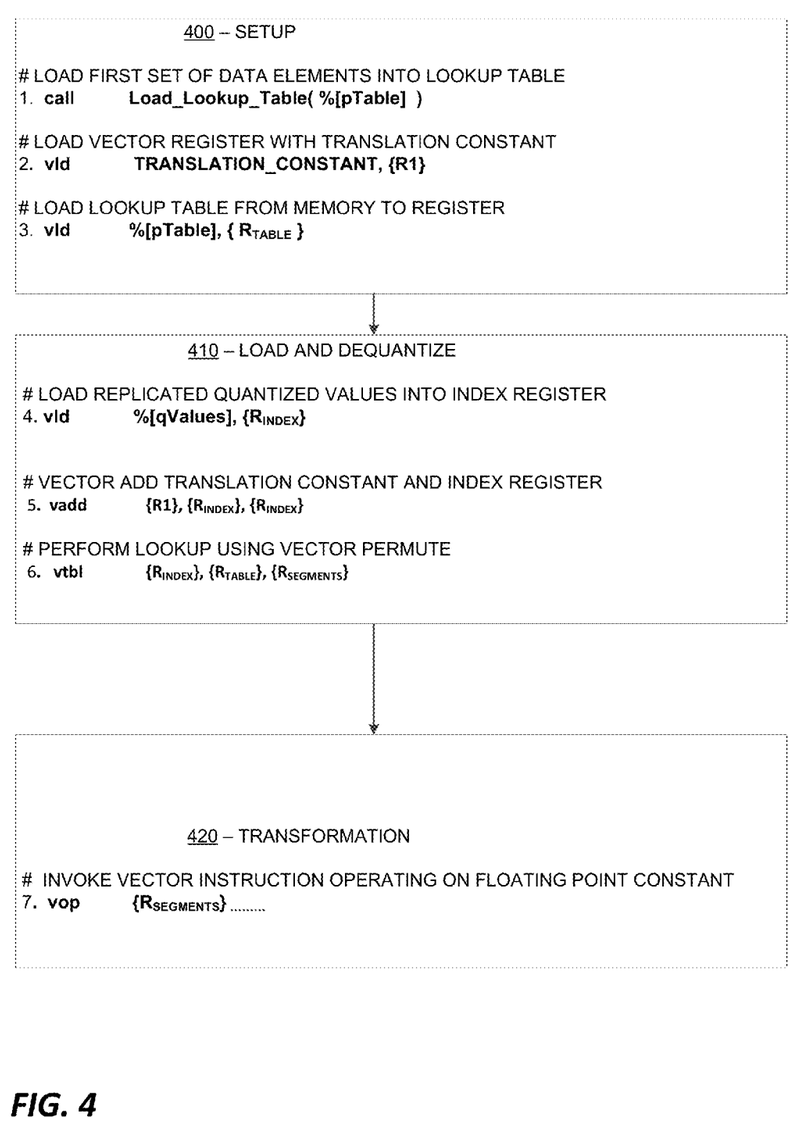
FIG. 4 is example pseudo-code for operation of the de-quantization engine of FIG. 1.

Referring now to FIG. 4, example pseudo-code is shown for an example embodiment as described herein. The example pseudo-code includes an initial setup section 400 lines 1-3, a section to load and de-quantized values 410 lines 4 and 5, and 6, and a transformation section 420 including line 7. In one embodiment, some of the operations are repeated multiple times to accommodate the architecture of a variety of processors (e.g., a processor may have multiple lanes. On some processors the instructions can be 8, 16, 32 or 64 bits wide. In one embodiment the load operation rearranges the byte to operate with the corresponding lookup operation.

In section 400, initial one time setup operations are executed for a predetermined lookup table and corresponding translation constant. If a particular vector processor has sufficient space the lookup table can be moved into registers or memory which allows faster access to the data elements by executing the instruction in line 3.

In section 410, line 4, the quantized values, for example, 2 bit values are loaded into an index register. It is understood that smaller or larger quantized value can be used. A shift and mask operation is used in certain embodiments to retrieve the 2-bit quantized values after replication before being added to the translation constant in line 5.

In line 6, the permute (vector table lookup) instruction may be repeated multiple times in certain embodiments where the permute instruction operates over multiple lanes (i.e., subsets of the vector processor memory/register sets).

As seen in the transformation section 420, instruction 7 represents invoking a vector instruction operating on floating point constant, for example, performing a vector multiplication instruction to multiply the feature vectors with a row of an fMPE matrix to produce enhanced feature vectors to enable automatic speech recognition in conjunction with Gaussian Mixture Model input techniques. Flow charts 700 and 800 shown below in FIGS. 7 and 8 describe portions of source code for the operation of an exemplary de-quantization engine 122 as implemented on a NEON SIMD instruction set on an ARM® 7 processor.

Figure 5:
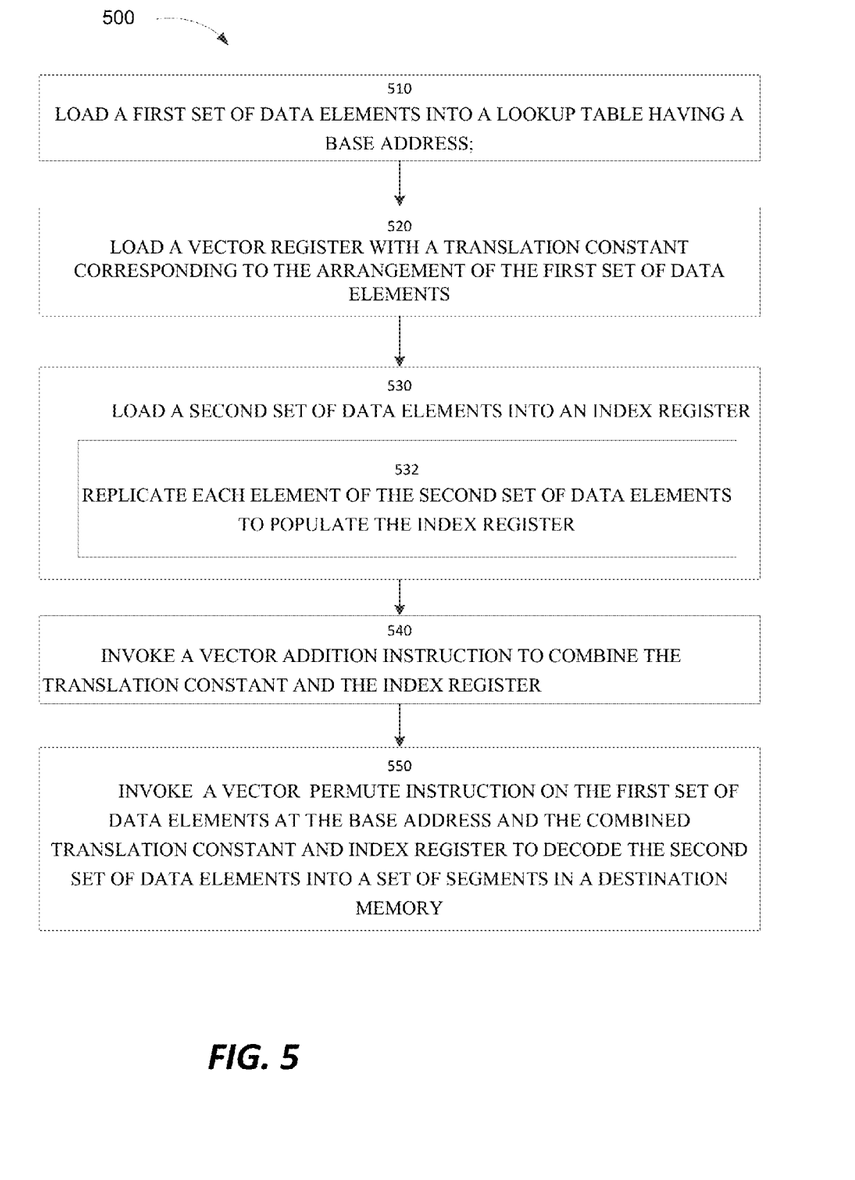
FIG. 5 is a flowchart illustrating an example of a process supporting the de-quantization engine of FIG. 1.

Now describing embodiments more specifically, FIG. 5 is a flow chart illustrating embodiments disclosed herein. In step 510, a first set of data elements is loaded into a lookup table having a base address. In one embodiment, the first set of data elements corresponds to a set of 32-bit floating point values to be used in FMPE operations to support speech recognition functionality. In another embodiment, the lookup table is stored in a plurality of vector registers.

In step 520, a first vector register is loaded with a translation constant corresponding to the arrangement of the first set of data elements. The translation constant represents a mapping of the first set of data elements and is a function of the vector processor 126 register organization and the desired result of the de-quantization process. In one embodiment, the translation constant effectively selects every fourth byte of a floating point value.

In step 530, a second set of data elements is loaded into an index register. In one embodiment, the set of data elements correspond to quantized fMPE transformation matrices which need to be expanded to floating point values. In one embodiment, the second set of data elements represent quantized values of a speech feature vector. In one particular processor, each element of the second set of data elements is replicated to populate the index register. On an exemplary vector processor, several index registers supply values for several lanes of data effectively allowing for the de-quantization of several elements of an fMPE transformation matrix simultaneously. In some embodiments and as shown in FIG. 2, each element of the second set of data elements is replicated to populate the index register as shown in step 532.

In step 540, a vector addition instruction is invoked to combine the translation constant and the index register. In one embodiment, this step sets up a combined translation constant and index register to be used in the subsequent permute operation.

In step 550, a vector permute instruction is invoked on the first set of data elements at the base address and the combined translation constant and index register to decode the second set of data elements into a set of segments in a destination memory. Depending on a particular vector processor used, the set of segments are decoded from non-consecutive data elements in the lookup table. In one embodiment a single SIMD instruction vector permute instruction is used.

In another embodiment the destination memory is a plurality of vector registers. In yet another embodiment, the set of segments represent floating point constants and at least one vector instruction can be invoked which operates on the floating point constants. This instruction can be multiplication of fMPE values for performing fMPE operations to enable automatic speech recognition. In one particular embodiment, the permute instruction is a single SIMD instruction. On an ARM processor, the single SIMD instruction vector permute instruction is a TBL instruction in a NEON instruction set. This type of operation when executed with multiple instructions without a de-quantization engine is sometimes referred to as "swizzling."

Figure 6:
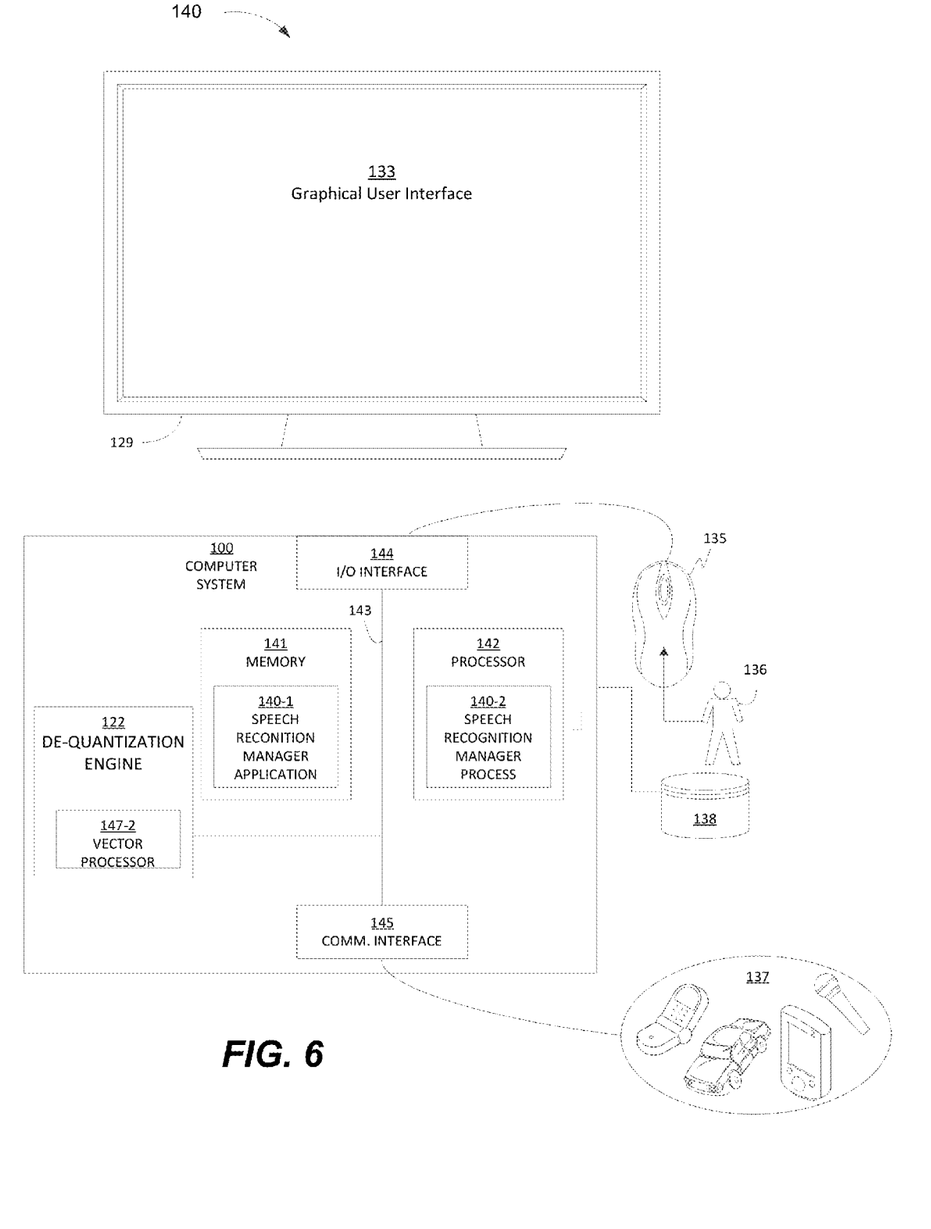
FIG. 6 is an example block diagram of a voice search manager operating in a computer/network environment according to embodiments herein.

FIG. 6 illustrates an example block diagram of a speech recognition system 140 including the de-quantization engine 122 operating in a computer/network environment according to embodiments herein. In summary, FIG. 6 shows computer system 100 displaying a graphical user interface 133 that provides a speech recognition interface. Computer system 100 can function as a client device such as a cell phone or other mobile device 137, or as a server that receives input from a given mobile device. Thus, computer system 100 can be—or connect to—a remote server for processing assistance.

In different embodiments, computer system 100 may be any of various types of devices, including, but not limited to, a cell phone, a personal computer system, desktop computer, laptop, notebook, or netbook computer, tablet computer, mainframe computer system, handheld computer, workstation, network computer, application server, storage device, a consumer electronics device such as a camera, camcorder, set top box, mobile device, tablet video game console, handheld video game device, or in general any type of computing or electronic device.

Computer system 100 is shown connected to display monitor 129 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc. As shown, computer system 100 of the present example includes an interconnect 143 that couples a memory system 141, a processor 142, I/O interface 144, and a communications interface 145. I/O interface 144 provides connectivity to peripheral devices such as input devices 135 including a computer mouse, a keyboard, a selection tool to move a cursor, display screen, etc. Communications interface 145 enables a speech recognition manager 140-1 of computer system 100 to communicate over a network and, if necessary, retrieve any data required to create views, process content, communicate with a user, etc. according to embodiments herein.

As shown, memory system 141 is encoded with speech recognition manager 140-1 that supports functionality as discussed above and as discussed further below. Speech recognition manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the speech recognition manager 140-1. Execution of the speech recognition manager 140-1 produces processing functionality in speech recognition manager process 140-2. In other words, the speech recognition manager process 140-2 represents one or more portions of the speech recognition manager 140 performing within or upon the processor 142 in the computer system 100. During execution of the speech recognition manager process, the de-quantization engine 122 executes to process fMPE transformation matrices.

It should be noted that, in addition to the speech recognition manager process 140-2 that carries out method operations as discussed herein, other embodiments herein include the speech recognition manager 140-1 itself (i.e., the unexecuted or non-performing logic instructions and/or data).

The speech recognition manager 140-1 and the de-quantization engine 122 may be stored on a non-transitory, tangible computer-readable storage medium including computer readable storage media such as floppy disk, hard disk, optical medium, etc. According to other embodiments, the de-quantization engine 122 can also be stored in a memory type system such as in firmware, read only memory (ROM), or, as in this example, as executable code within the memory system 141.

Figure 7:
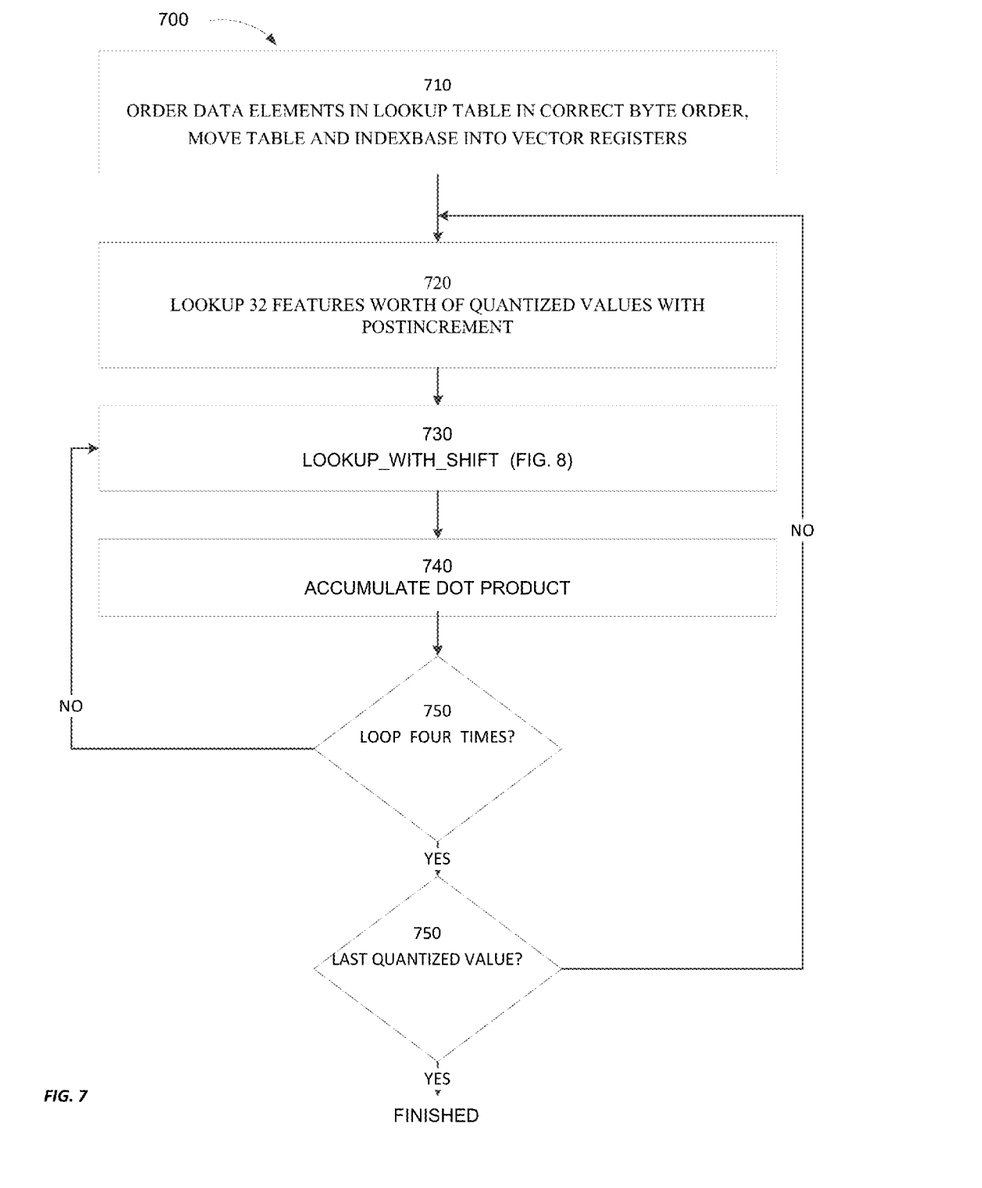
FIG. 7 is a flowchart illustrating an example implementation of a dot product computation using the de-quantization engine of FIG. 1.

Now referring to FIG. 7, a flow chart 700 illustrates embodiments as implemented on an Arm v7 processor with a NEON Instruction set, as disclosed herein. In step 710, a set of data elements in a lookup table is ordered to facilitate subsequent vector operations by reordering an input lookup table of four 32 bit values into 16 non-consecutive bytes. In one embodiment, the lookup table is setup using a VTBL instruction in conjunction with the translation constant. In this embodiment the data elements corresponds to a set of 32-bit floating point values in calculating a dot product. Also in step 710, the lookup table and the index base are moved into vector registers.

In step 720, 32 quantized features values are looked up. In one implementation a combination of vector load "VLD" and vector extract "VEXT" byte instructions are used to duplicate each quantized value eight times.

In step 730, a LOOKUP_WITH_SHIFT macro is called shift source lanes and performs the lookup which effectively dequantizes the 2-bit index. In step 740, the dot product is accumulated using a 32-bit vector multiply "VMLA" instruction. On the first entry into the 730 to 750 loop a 32-bit "VMUL" instruction is used to zero the accumulator. It is understood that the 730 to 750 loop can be "unrolled" to eliminate the overhead of test and branch instructions.

At step 750 it is determined whether the LOOKUP_WITH_SHIFT macro has been called four times. If the LOOKUP_WITH_SHIFT routine has not been called four times, processing continues at step 730 with the next set of quantized values. If the LOOKUP_WITH_SHIFT routine has been called four times, processing continues at step 750 where is determined whether all of the quantized values have been processed (i.e., dequantized). If all of the quantized values have been processed the process is finished, otherwise processing continues at step 720.

Figure 8:
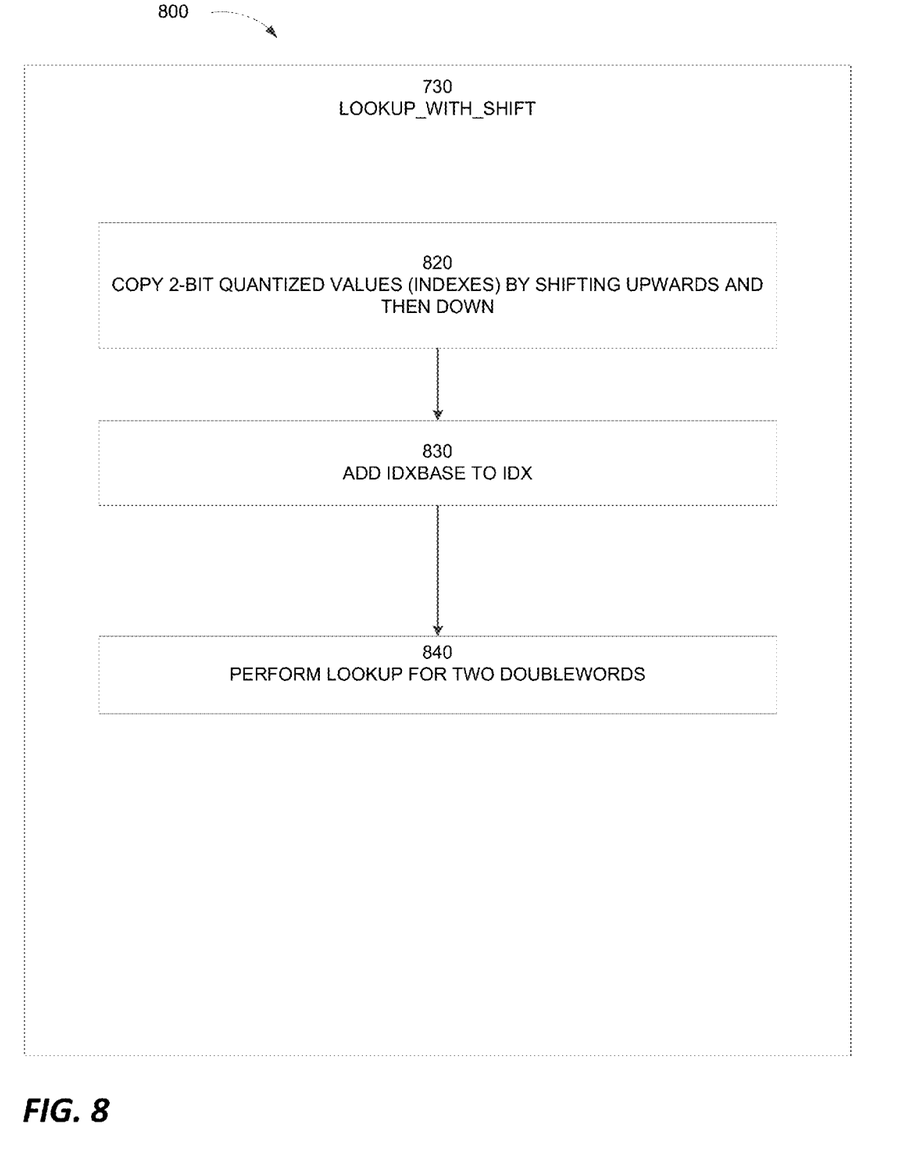
FIG. 8 is a flowchart illustrating a LOOKUP_WITH_SHIFT macro of the implementation of FIG. 7.

Now referring to FIG. 8, a flow chart 800 illustrates an implementation of the LOOKUP_WITH_SHIFT macro using the Neon instruction set. The LOOKUP_WITH_SHIFT macro is called with an indication of how many bits to shift source lanes to select the two bit indices to be dequantized. In step 820, 2-bit quantized values (indices) are copied by shifting upwards and then down again using vector shift operations "vshl" and "vshr." The index base is added to the index using a vector add operation. In step 840, a lookup is performed. In this implementation, the vector table lookup operation "vtbl" is performed twice for each of two doublewords. This routine quickly looks up 32-bit values using an 8-bit vtbl operator. The routine implemented as a macro in one embodiment encodes the lookup in only five instructions.

In addition to these embodiments, it should also be noted that other embodiments herein include the execution of the de-quantization engine 122. Thus, those skilled in the art will understand that the computer system 100 can include other processes and/or software and hardware components, such as an operating system that controls allocation and use of hardware resources, or multiple processors. It is understood that the techniques and system disclosed herein can be applied in fields other that speech recognition where data manipulation of quantized values is required.

In other embodiments, the techniques disclosed above can be used for decoding operations in addition to de-quantization of quantized values. In these embodiments, the translation constant can be varied to select different arrangements for the lookup table and multiple lookup tables can be used. In one embodiment, a bytewise integer lookup operation effectively performs a floating point or a multiple byte lookup.

Those skilled in the art will also understand that there can be many variations made to the operations of the techniques explained above while still achieving the same objectives of the invention. Such variations are intended to be covered by the scope of this invention. As such, the foregoing descriptions of embodiments of the invention are not intended to be limiting. Rather, any limitations to embodiments of the invention are presented in the following claims.

The invention claimed is:

1. A computer-implemented method for performing automatic speech recognition, the method comprising, using at least one processor programmed to perform:
    loading a first set of data elements into a lookup table having a base address;
    loading a vector register with a translation constant corresponding to an arrangement of the first set of data elements;
    loading a second set of data elements into an index register;
    invoking a vector addition instruction to combine the translation constant and the index register;
    invoking a vector permute instruction on the first set of data elements at the base address and the combined translation constant and index register to decode the second set of data elements into a set of segments in a destination memory;
    reconstructing a plurality of quantized values into a plurality of dequantized values in parallel;
    producing, based on the plurality of dequantized values, a plurality of enhanced feature vectors; and
    outputting the plurality of enhanced feature vectors to a speech recognizer that performs automatic speech recognition based on the plurality of enhanced feature vectors.

2. The computer-implemented method of claim 1, wherein the lookup table comprises a plurality of vector registers.

3. The computer-implemented method of claim 1, wherein the destination memory comprises a plurality of vector registers.

4. The computer-implemented method of claim 3, wherein the set of segments comprise a representation of a floating point constant; and
    further comprising invoking at least one vector instruction operating on the floating point constant.

5. The computer-implemented method of claim 4, wherein the at least one vector instruction is a multiplication of a feature vector and row of an fMPE matrix.

6. The computer-implemented method of claim 1, wherein the set of segments are decoded from non-consecutive data elements in the lookup table.

7. The computer-implemented method of claim 1, wherein the permute instruction comprises a single SIMD instruction.

8. The computer-implemented method of claim 7, wherein the single SIMD instruction vector permute instruction comprises a TBL instruction in a NEON instruction set.

9. The computer-implemented method of claim 1, wherein the second set of data elements represent quantized values of a speech feature vector.

10. The computer-implemented method of claim 1, wherein loading a second set of data elements into an index register further comprises replicating each element of the second set of data elements to populate the index register.

11. A system for performing automatic speech recognition, the system comprising:
one or more processors;
a memory including one or more instructions stored thereon that, when executed by the one or more processors, cause the one or more processors to perform operations comprising:
loading a first set of data elements into a lookup table having a base address;
loading a first vector register with a translation constant corresponding to an arrangement of the first set of data elements;
loading a second set of data elements into an index register;
invoking a vector addition instruction to combine the translation constant and the index register;
invoking a vector permute instruction on the first set of data elements at the base address and the combined translation constant and index register to decode the second set of data elements into a set of segments in a destination memory;
reconstructing a plurality of quantized values into a plurality of dequantized values in parallel;
producing, based on the plurality of dequantized values, a plurality of enhanced feature vectors; and
outputting the plurality of enhanced feature vectors to a speech recognizer that performs automatic speech recognition based on the plurality of enhanced feature vectors.

12. The system of claim 11, wherein the lookup table comprises a plurality of vector registers; and
wherein the destination memory comprises a plurality of vector registers.

13. The system of claim 12, wherein the set of segments comprise a representation of a floating point constant; and
further comprising invoking at least one vector instruction operating on the floating point constant.

14. The system of claim 13, wherein the at least one vector instruction is a multiplication of a feature vector and a row of an fMPE matrix.

15. The system of claim 11, wherein the set of segments are decoded from non-consecutive data elements in the lookup table.

16. The system of claim 15, wherein the permute instruction comprises a single SIMD instruction.

17. The system of claim 11, wherein the single SIMD instruction vector permute instruction comprises a TBL instruction in a NEON instruction set.

18. The system of claim 11, wherein the second set of data elements represents quantized values of a speech feature vector.

19. The system of claim 11, wherein loading a second set of data elements into an index register further comprises replicating each element of the second set of data elements to populate the index register.

20. A computer program product including a non-transitory computer-storage medium having instructions stored thereon for processing data information for performing automatic speech recognition, such that the instructions, when carried out by a processing device, cause the processing device to perform:
loading a first set of data elements into a lookup table having a base address;
loading a first vector register with a translation constant corresponding to an arrangement of the first set of data elements;
loading a second set of data elements into an index register;
invoking a vector addition instruction to combine the translation constant and the index register;
invoking a vector permute instruction on the first set of data elements at the base address and the combined translation constant and index register to decode the second set of data elements into a set of segments in a destination memory;
reconstructing a plurality of quantized values into a plurality of dequantized values in parallel;
producing, based on the plurality of dequantized values, a plurality of enhanced feature vectors; and
outputting the plurality of enhanced feature vectors to a speech recognizer that performs automatic speech recognition based on the plurality of enhanced feature vectors.

* * * * *